June 7, 1966     A. F. BECKER     3,254,574
METHOD OF MANUFACTURING BAGS
Original Filed Jan. 24, 1963     7 Sheets-Sheet 1

Arnold F. Becker,
Inventor.
Koenig, Senniger, Powers and Leavitt,
Attorneys.

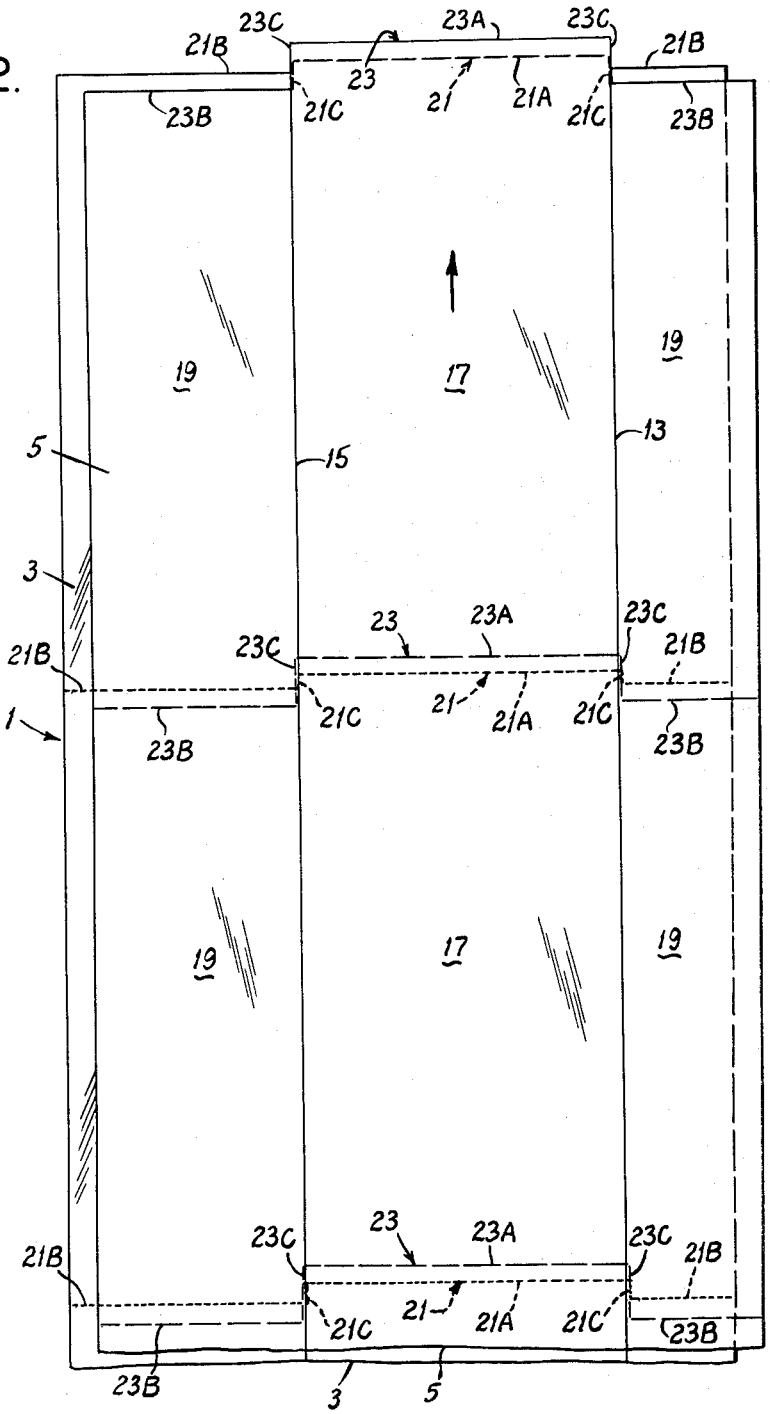

June 7, 1966      A. F. BECKER      3,254,574
METHOD OF MANUFACTURING BAGS
Original Filed Jan. 24, 1963      7 Sheets-Sheet 3
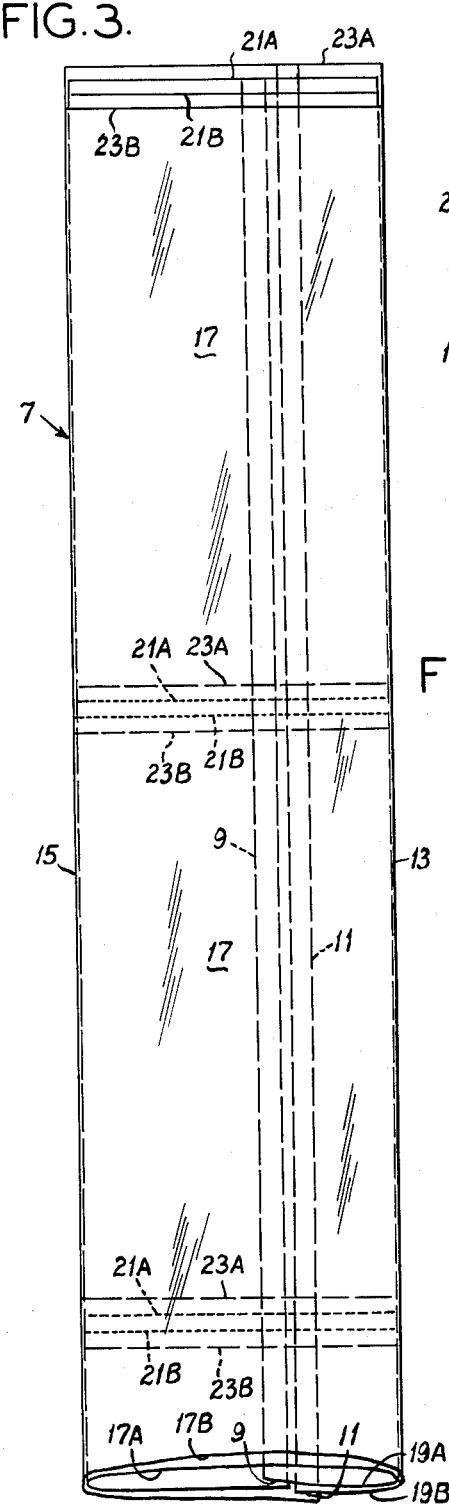
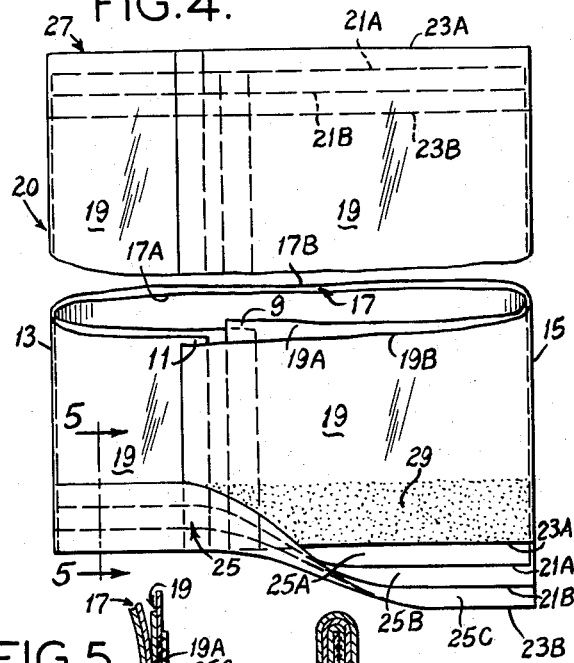
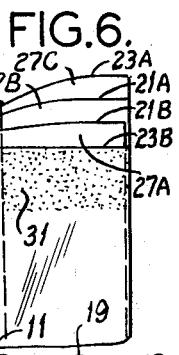
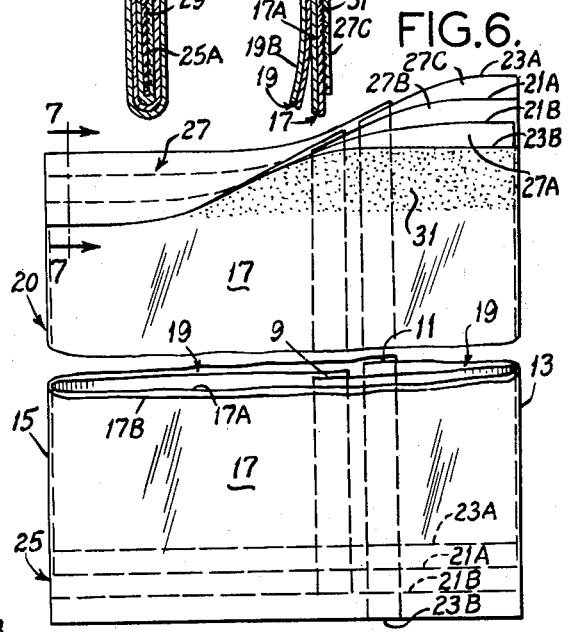

June 7, 1966    A. F. BECKER    3,254,574
METHOD OF MANUFACTURING BAGS
Original Filed Jan. 24, 1963    7 Sheets-Sheet 4

June 7, 1966  A. F. BECKER  3,254,574

METHOD OF MANUFACTURING BAGS

Original Filed Jan. 24, 1963  7 Sheets-Sheet 5

June 7, 1966 A. F. BECKER 3,254,574
METHOD OF MANUFACTURING BAGS
Original Filed Jan. 24, 1963 7 Sheets-Sheet 6

June 7, 1966  A. F. BECKER  3,254,574
METHOD OF MANUFACTURING BAGS
Original Filed Jan. 24, 1963  7 Sheets—Sheet 7

United States Patent Office 3,254,574
Patented June 7, 1966

3,254,574
METHOD OF MANUFACTURING BAGS
Arnold F. Becker, San Pedro, Calif., assignor to Bemis Company, Inc., a corporation of Missouri
Original application Jan. 24, 1963, Ser. No. 253,653, now Patent No. 3,203,620, dated Aug. 31, 1965. Divided and this application Apr. 23, 1965, Ser. No. 450,432
3 Claims. (Cl. 93—35)

This application is a division of my copending application Serial No. 253,653, filed Jan. 24, 1963, now Patent No. 3,203,620, issued August 31, 1965. This invention relates to methods of manufacturing bags, and more particularly to methods of manufacturing bags with pinch-type end closures.

This invention is particularly concerned with the manufacture of multi-ply bags having a pinch-type end closure formed by folding an end portion of a length of bag tubing over on the body of the bag tubing and securing it thereto. The contents of bags, especially if of finely divided particles, tend to sift out of end closures, and particularly if gussets are provided at the end closures and the adjacent portions are not accurately aligned. The manufacturers of bags having pinch-type end closures normally close the lower ends of bags made from bag tubing, while leaving the upper ends of the bags open so that packers or fillers of the bags may fill the bags and thereafter close and secure the upper ends for shipment.

Accordingly, among the several objects of this invention are the provision of a method of manufacturing multi-ply bags such as described in which a pinch-type end closure is arranged which may be easily secured and will avoid sifting of the contents of the bag at such closure; the provision of a method of manufacturing multi-ply bags with such a pinch-type end closure in which the bag may be initially closed along a heat seal line on the end closure before the end closure is folded and secured to the body of the bag tubing; the provision of a method of manufacturing bags with a pinch-type end closure which is suitable as a closure for both ends of the bag; and the provision of a method of manufacturing bags of the class described from continuous paper webs involving the formation of a continuous tube and segmenting the tube into bag lengths ready for folding over of the end flaps. Other objects and features will be in part apparent and in part pointed out hereinafter.

The invention accordingly comprises the methods hereinafter described, the scope of the invention being indicated in the following claims.

In the accompanying drawings, in which several of various possible embodiments of the invention are illustrated, FIG. 1 is a top view of a portion of a length of a continuous multi-ply web having certain lines of weakness made therein in accordance with this invention, illustrating certain initial steps of the method of making non-gusseted bags constituting one embodiment of the invention;

FIG. 2 is a bottom view of the portion of the length of the continuous multi-ply web shown in FIG. 1;

FIG. 3 is a view of a portion of a continuous multi-ply nongusseted tube made from the web shown in FIGS. 1 and 2 and illustrating how the tube is segmented into individual bag lengths;

FIG. 4 is an elevation of an individual bag length taken from the seamed side of the bag length and showing an end closure on each end, the end closure on the lower end of the bag length being partially secured and facing oppositely from the end closure on the upper end of the bag length;

FIG. 5 is a section taken along line 5—5 of FIG. 4;

FIG. 6 is an elevation similar to FIG. 4 but taken from the side of the bag length opposite its seamed side;

FIG. 7 is a section taken along line 7—7 of FIG. 6;

Corresponding reference characters indicate corresponding parts throughout the several views of the drawings.

Figure 1:
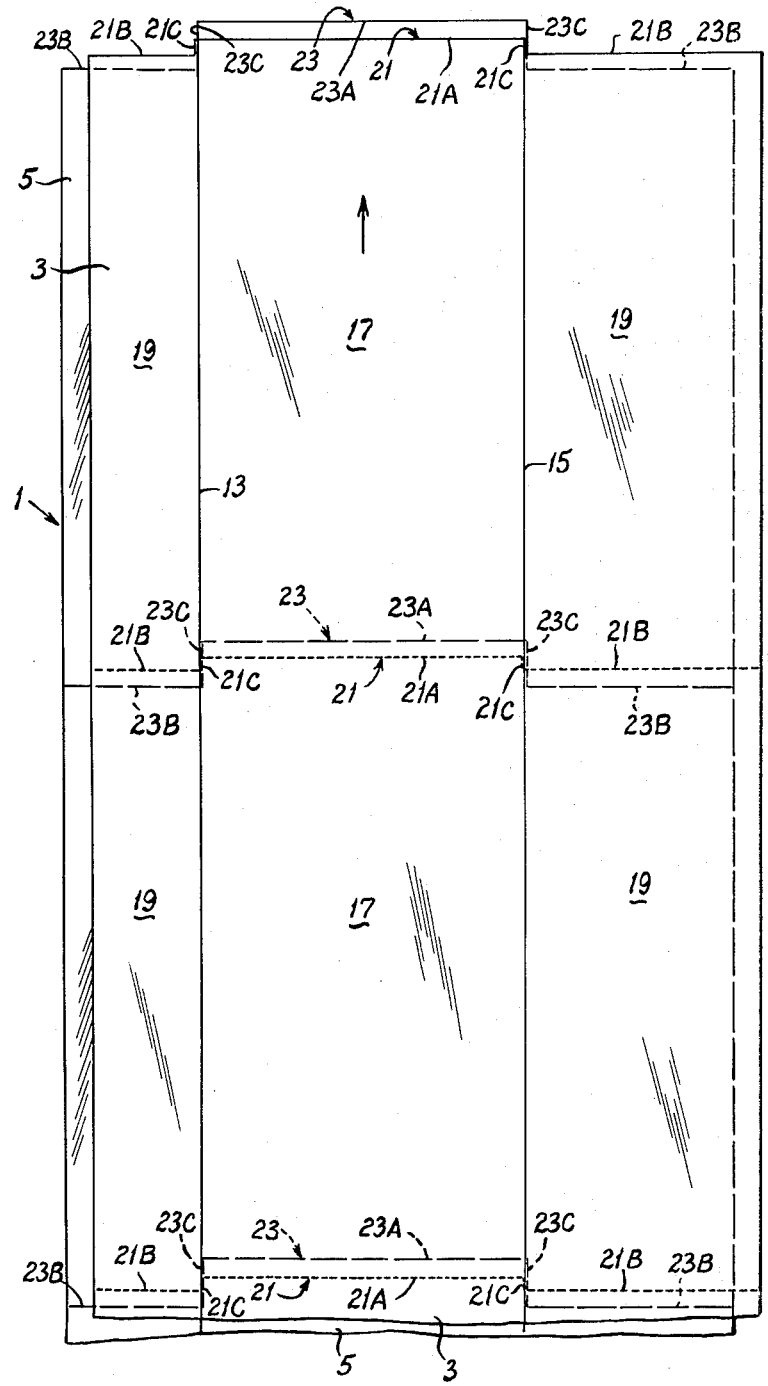

Referring to the emodiment shown in FIGS. 1–7 in which flat bags are provided, and more particularly to FIGS. 1 and 2 of the drawings, there is shown a portion of the length of a continuous multi-ply web 1, herein illustrated as having two plies 3 and 5 of bag material, the plies being laterally offset in accordance with conventional practice. The multi-ply web 1 is made by combining two continuous webs of bag material, such as kraft paper, or a plastic material for an inner ply of the bag in some instances, as the webs are continuously fed toward a tuber. The combined web travels in the direction indicated by the arrows in FIGS. 1 and 2. In the tuber, the web is formed into a continuous flat tube 7 (FIG. 3) with pasted longitudinal inner and outer seams 9 and 11, respectively, for plies 3 and 5. This follows conventional practice in the art of bag manufacture, utilizing known equipment for forming bag tubing. It will be understood that, in accordance with conventional practice, plies 3 and 5 may be interfacially spot pasted together. Lines 13 and 15 in plies 3 and 5 of web 1 indicate fold lines and these fold lines are designated by like numerals 13 and 15 in FIGS. 3, 4 and 6. Lines 13 and 15 appear as the side edges of the flat tube and of flat bags made from the tube. Portions 17 of the web between lines 13 and 15 become one wall of the tube and each forms a wall of a bag made from the tube. Each portion 17 is referred to for convenience as the front wall of a bag. The portions 19 of web 1 outward of lines 13 and 15, which are united by longitudinal tube seams 9 and 11, becomes the other wall of the tube and also become walls of the ultimate bag. This wall is hereafter referred to, for convenience, as the back or rear wall of the tubing and bag. The inner and outer plies of front wall 17 formed by plies 3 and 5 are hereinafter referred to respectively as 17A and 17B and the inner and outer plies of back wall 19 are referred to respectively as 19A and 19B.

The tube 7 is segmented at bag length intervals by severing at stepped lines of weakness or tear lines, such as for example lines of perforation, indicated generally at 21 for ply 3 and at 23 for ply 5. For convenience in distinguishing lines 21 and 23, line 21 is shown in FIGS. 1 and 2 as a dotted line, whereas line 23 is shown as a dashed line. Referring to FIGS. 1 and 2, each line of weakness 21 in web 3 (which forms inner ply 17A in wall 17 and inner ply 19A in wall 19 when the tube is formed) extends transversely across web 3 from one side to the other. Each has a central portion 21A extending transversely of the web between the longitudinal fold lines 13 and 15 and side portions 21B both offset in the same direction from central portion 21A extending from lines 13 and 15 to the side edges of the web. Side portions 21B are transversely aligned. Longitudinally extending steps constituted by weakened lines 21C connect the outer ends of portions 21A and the inner ends of portions 21B.

Each line of weakness 23 in web 5 (which forms outer ply 17B in wall 17 and outer ply 19B in wall 19 when the tube is formed) extends transversely across web 5 from one side to the other and constitutes a transverse central or center line 23A and transversely aligned side lines 23B on each side of center line 23A. Side lines 23B extend to the edges of web 3 from line 23A and are offset longitudinally from center line 23A. Longitudinally extending lines 23C connect transverse lines 23A and 23B.

The edges formed by lines of weakness 21 and 23 when the tube is severed at bag length intervals are designated by the same reference numerals in FIGS. 3–7. When webs 3 and 5 are formed into the continuous flat tube 7 as shown in FIG. 3, line 21A and 23A are on front wall 17 while lines 21B and 23B are on back wall 19. The longitudinal seams 9 and 11 are in back wall 19. It is to be understood that plies 17A and 17B of front wall 17 and plies 19A and 19B of back wall 19 are spot pasted together across the width of the walls and preferably at least adjacent the ends of the bag lengths. When the tube 7 is severed to form bag length 20 as shown in FIG. 4, a stepped end formation or imbrication is formed by lines of weakness 21 and 23 at each end of bag length 20 to provide a lower or bottom end closure or flap indicated generally by numeral 25 and an upper end closure or flap indicated generally by numeral 27. The upper end closure 27 is adapted to be folded over on front wall 17 and the lower end closure 25 is adapted to be folded over on back wall 19 and facing in a direction opposite that of upper end closure 27.

Referring to FIGS. 4 and 5, the lower end closure 25 forms a plurality of successive extensions of flap portions from edge 23A of outer back ply 19B to edge 23B of outer front ply 17B. Edge 21A, being longitudinally offset from edge 23A, forms exposed extension 25A of inner back ply 19A; edge 21B, being longitudinally offset from edge 21A, forms exposed extension 25B of inner front ply 17A; and edge 23B, being longitudinally offset from edge 21B, forms exposed extension 25C of outer front ply 17B. A fold line for end closure 25 extends across the entire width of bag length 20 generally coincident with edge 23A. An adhesive, such as a remoistenable dextrin type adhesive, is applied to an area of outer back ply 19B extending across the entire width thereof as indicated at 29 in FIG. 4, and the adhesive area is of a width at least that of lower end closure 25 so as to contact the entire surface of end closure 25 when it is secured. Upon moistening of adhesive area 29 and folding of end closure 25 into contact with back outer ply 19B along the fold line coincident with edge 23A, each of extensions 25A, 25B, and 25C is secured in face-to-face relation with back outer ply 19B extending across the entire width of bag length 20. Thus, three separate glue or adhesive lines are formed across the entire width of ply 19B as shown in FIG. 5, one for each extension 25A, 25B, and 25C.

Referring to FIGS. 6 and 7, the upper end closure or flap 27, facing in a direction opposite lower end closure or flap 25, forms a plurality of successive extensions or flap portions from edge 23B of front outer ply 17B to edge 23A of rear outer ply 19B. Edge 21B, being longitudinally offset from edge 23B, forms exposed extension 27A of inner front ply 17A; edge 21A, being longitudinally offset from edge 21B, forms exposed extension 27B of inner back ply 19A; and edge 23A, being longitudinally offset from edge 21A, forms exposed extension 27C of outer back ply 19B. The fold line for end closure 27 extends across the entire width of bag length 20 generally coincident with edge 23B. An adhesive area 31 is applied to outer front ply 17B across the entire width thereof by suitable means, and upon folding of end closure 27 along the fold line at edge 23B onto front outer ply 17B, glue or adhesive lines are formed across the entire width of ply 17B by each of extensions 27A, 27B, and 27C as indicated in FIG. 7. Inner plies or walls 17A and 19A form an inner sleeve while outer plies or walls 17B and 19B form an outer sleeve.

Normally, the lower end closure 25 will be secured or closed at the bag manufacturing plant, whereas upper end closure 27 would normally be closed after filling of the bags. Thus, the type of adhesive employed, particularly on upper end closure 25, is subject to variation, depending in part upon the requirements of the packers or fillers of the bags.

Figure 8:
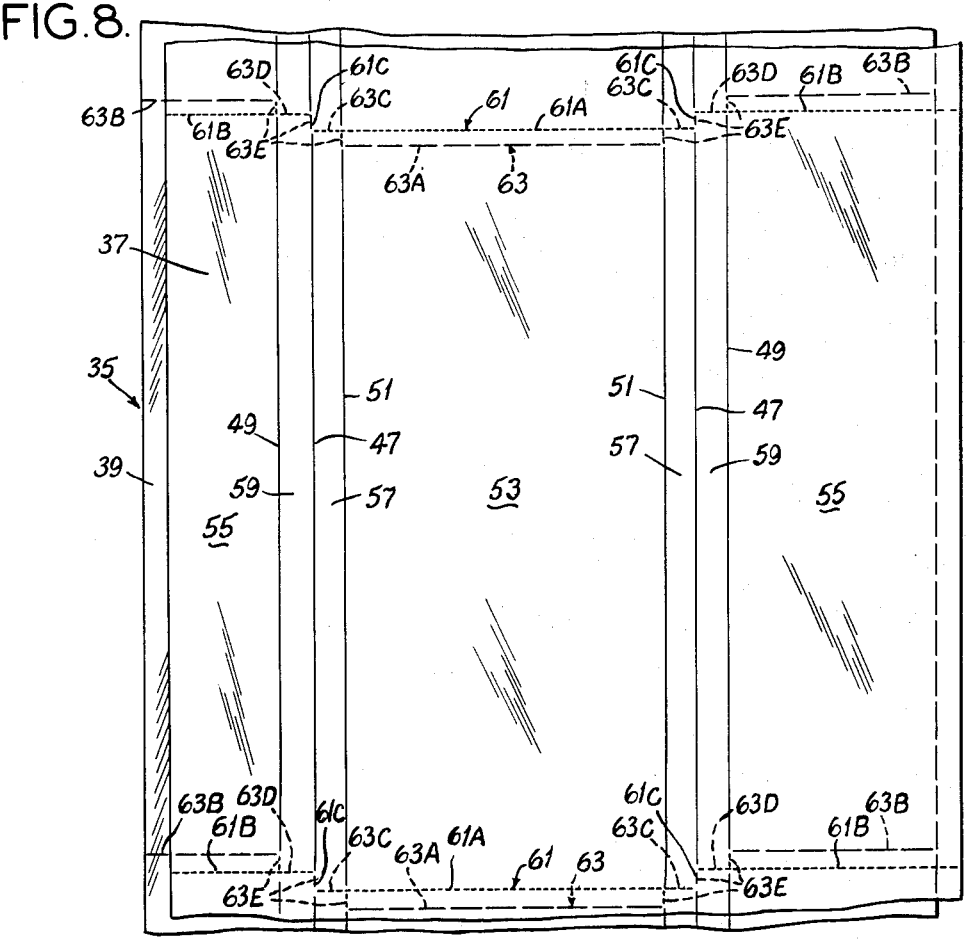
FIG. 8 is a top plan of a portion of a length of a continuous multi-ply web and illustrating certain initial steps of the method of making gusseted bags constituting another embodiment of this invention.
Figure 9:
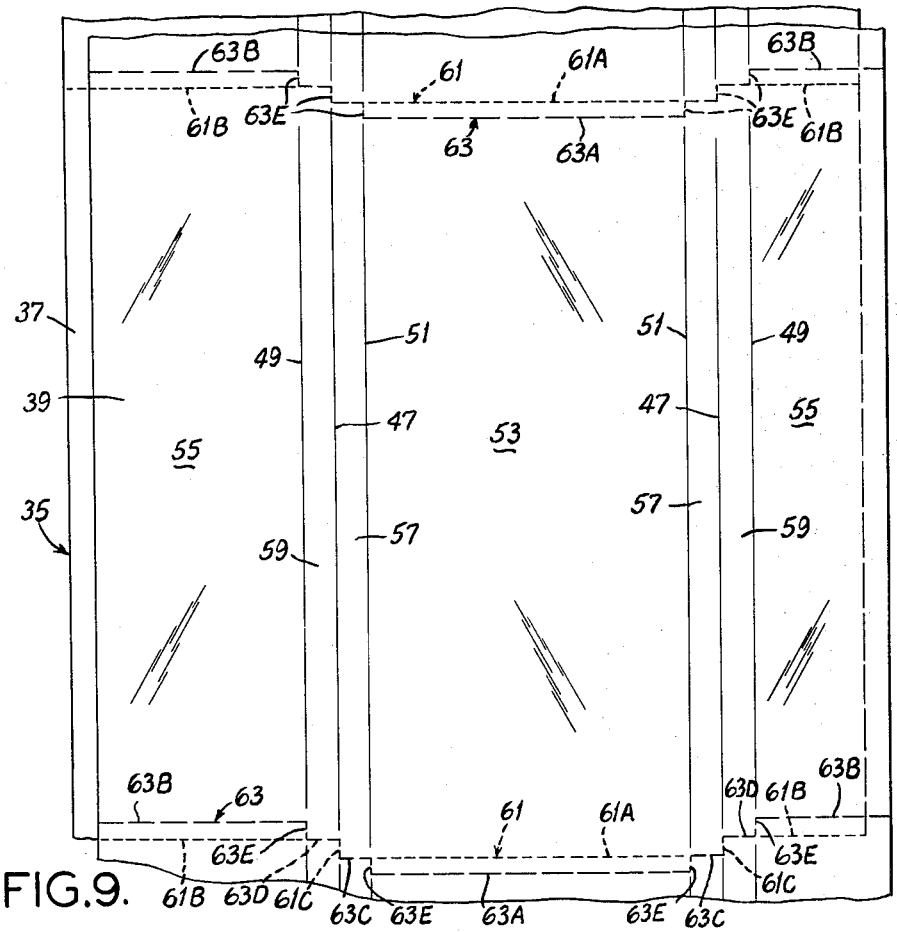
FIG. 9 is a bottom plan of a portion of the length of the continuous multi-ply web shown in FIG. 8 for making gusseted bags.
Figure 10:
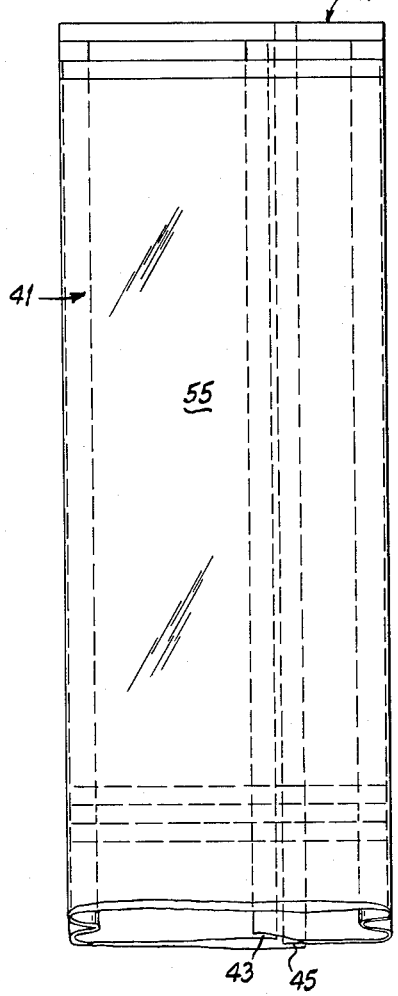
FIG. 10 is a view of a portion of a continuous multi-ply gusseted tube made from the web shown in FIGS. 8 and 9 and illustrating how the tube is segmented into individual bag lengths.

Referring now to FIGS. 8–15, an embodiment of the invention is illustrated in which gusseted bags are constructed with end closures made according to the present invention. A multi-ply web indicated generally in FIGS. 8 and 9 by numeral 35 is formed from two offset plies 37 and 39 in a manner similar to the embodiment of FIGS. 1–7 and a continuous gusseted tube 41 is formed therefrom with respective pasted longitudinal inner and outer seams 43 and 45, as shown in FIG. 10.

Lines 47 shown in FIGS. 8 and 9 represent inner or central fold lines of the ultimate gussets and these fold lines are designated by the same reference character 47 in FIGS 10, 11, 13 and 15. The lines 49 and 51 in FIGS. 8 and 9 represent the outer fold lines of the gussets and these appear as the side edges of the gusseted tube and of bags made from this tube as shown in FIGS. 10, 11, 13 and 15. Portions 53 of the web between lines 51 become the front wall of the tube and bags made from the tube. Portions 55 of the web outward of lines 49 become the back wall of the tube. Portions 57 between fold lines 47 and 51 become panels of the gussets hinged at fold lines 51 to front wall 53, and portions 59 between fold lines 47 and 49 become the gusset panels hinged at fold lines 49 to back wall 55. The inner and outer plies constituting gusset panels 57 and 59 are respectively denoted 57A, 57B and 59A, 59B.

Tube 41 is segmented at bag length intervals by severing at lines of weakness, such as perforated lines, indicated generally at 61 for ply 37 and indicated generally at 63 for ply 39, line 61 being shown in FIGS. 8 and 9 as a dotted line, whereas line 63 is shown as a dashed line. Line of weakness 61 for ply 37, which forms the inner plies 53A and 55A of the completed bag, is similar to that of inner ply 3 of the embodiment of FIGS. 1–7. Line of weakness 61 extends transversely across web 37 and constitutes a transverse center line 61A and a transverse side line 61B on each side of center line 61A. Side lines 61B are transversely alinged and extend to the edges of web 37 from line 61A and are offset longitudinally from center line 61A. Longitudinally extending lines 61C at fold lines 47 connect lines 61A and 61B. Outer plies or walls 53B and 55B form an outer sleeve while inner plies or walls 53A and 55A form an inner sleeve.

Each line of weakness 63 in web 39 which forms outer ply 53B in front wall 53 and outer ply 55B in back wall 55 when tube 41 is formed, extends across web 39 and constitutes a central line 63A in wall 53 and side lines 63B in wall 55. Further, intermediate transverse lines 63C and 63D in gusset panels 57 and 59, respectively, are provided. Each transversely extending line 63A, 63B, 63C, and 63D is longitudinally offset from the others and longitudinally extending lines 63E connect 63A, 63B, 63C and 63D together.

When tube 41 is severed at bag length intervals, a stepped end formation or imbrication is provided at each end of the bag length, the edges formed by lines of weakness 61 and 63 being designated by the same reference numerals in FIGS. 11-15. The stepped end formation at each end of the bag length forms a lower end closure or flap indicated generally at 65 and an upper end closure or flap indicated generally at 67, the lower end closure 65 adapted to be folded over on back wall 55, the upper end closure 67 adapted to be folded over on front wall 53 and facing in a direction opposite that of lower end closure 65. End closures 65 and 67 are identical to end closures 25 and 26 of the embodiment of FIGS. 1–7 except for the addition of gussets to closures 65 and 67.

Figure 11:
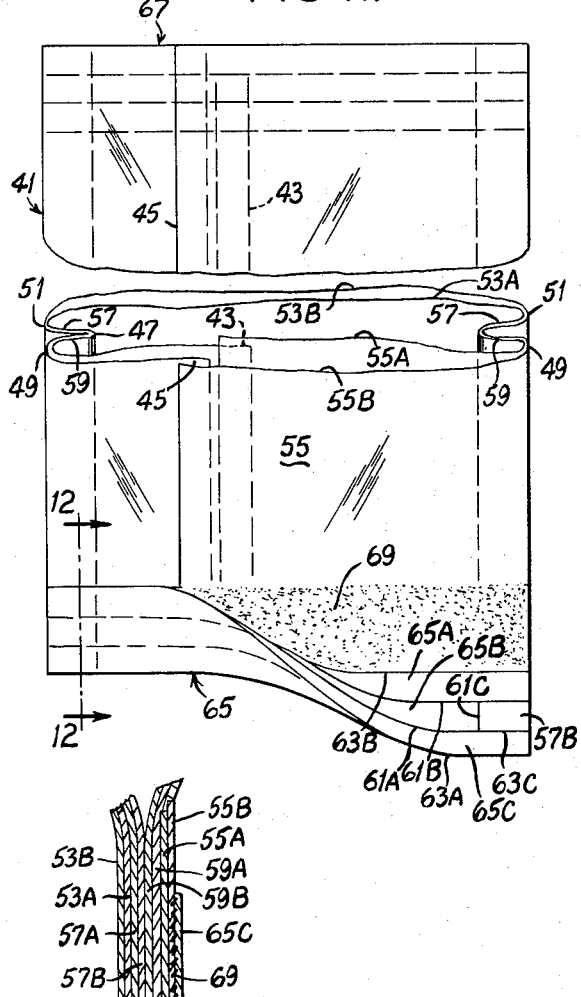
FIG. 11 is an elevation taken from the seamed side of a gusseted bag length and showing end closures, the end closure on the lower end of the bag length being partially secured.
Figure 12:
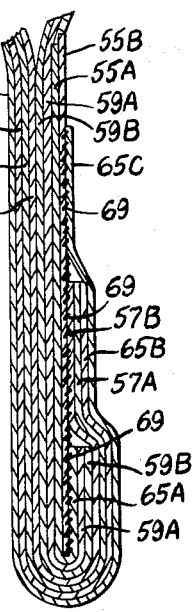
FIG. 12 is a section taken along line 12—12 of FIG. 11.

Referring to FIGS. 11 and 12 in which lower end closure 65 is shown, extensions from edge 63B of outer back ply 55B to edge 63A of outer front ply 53B are formed and successively denoted 65A, 65B, and 65C. It is to be noted from FIGS. 11 and 15 that a portion of gusset panel 57 extends beyond gusset panel 59 in end closure 65 to form a stepped portion, gusset panel 59 in end closure 65 being coextensive with extension 65A. An adhesive area indicated at 69 of suitable adhesive is provided across the width of outer ply 55B and end closure 65 is secured thereon as shown in FIG. 12. Extensions 65A, 65B, 65C are in face-to-face secured relation to outer back ply 55B when end closure 65 is folded along a fold line coincident with edge 63B.

Figure 13:
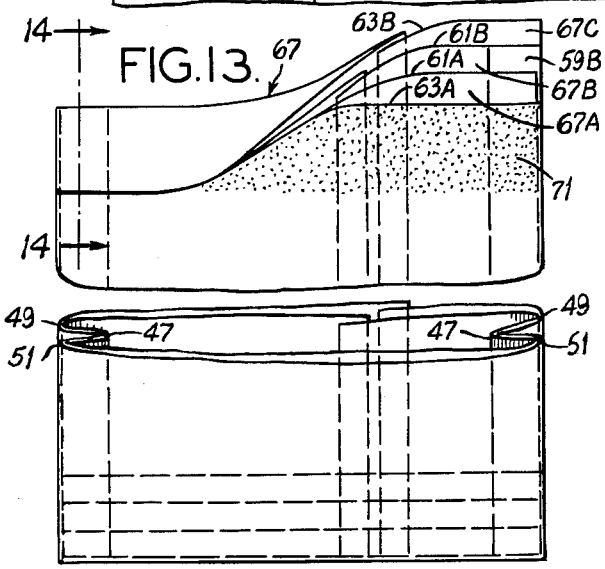
FIG. 13 is an elevation of a gusseted bag length similar to FIG. 11 but taken from the side of the bag length opposite the seamed side.
Figure 14:
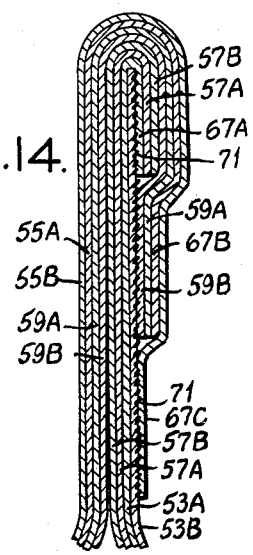
FIG. 14 is a section taken along line 14—14 of FIG. 13.
Figure 15:
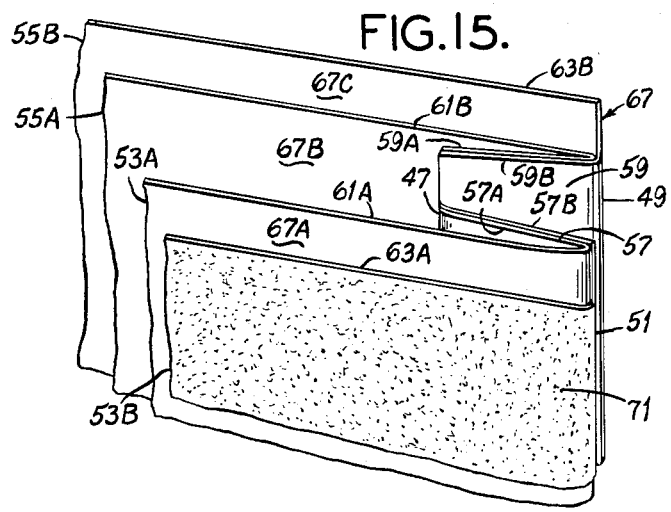
FIG. 15 is an enlarged segment in perspective of the top closure shown in FIG. 13 before folding.

Referreing to FIGS. 13, 14, and 15, upper end closure 67 has successive extensions or flap portions 67A, 67B, and 67C thereon from edge 63A to edge 63B. An adhesive area 71 is provided across the width of outer front ply 63B and extensions 67A, 67B, and 67C are in face-to-face secured relation to outer front ply 53B when end closure 67 is folded along a fold line coincident with edge 63A. It is to be noted that FIGS. 12 and 14 are sections through gusset panels 57 and 59, and while sections are not shown through end closures 65 and 67 intermediate the gusseted sides of the bag, it is to be understood that such sections would be similar to that shown in the embodiment of FIGS. 1–7 for a flat bag.

Referring to FIGS. 16–19, an additional embodiment of the invention is illustrated in which a gusseted bag indicated generally by the numeral 73 has a separate sealing tape indicated generally at 75 for an end closure 77 adapted to be folded along a fold line at 79 and to be secured to tape 75. End closure 77 is formed with stepped extensions or flap portions in the manner set forth in the embodiment of FIGS. 8–15. Tape 75 has an intermediate strip 81 with a pressure-sensitive adhesive layer 83 on the inner face thereof securing tape 75 to an outer ply 85 of bag 73. The outer face of strip 81 has a pressure-sensitive adhesive layer 87 thereon and a cover strip 89 is removably secured to layer 87 and adapted to be peeled away when end closure 77 is to be secured.

Figure 16:
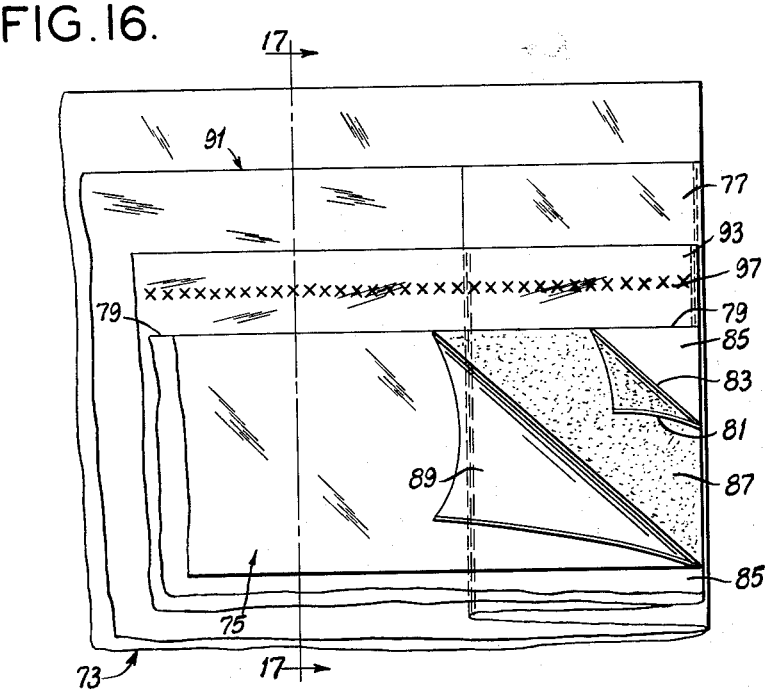
FIG. 16 is an enlarged fragment in plan of a modification in which the inner ply is formed of polyethylene and a separate securing strip is secured to the outer ply for securing the adjacent end closure.
Figure 17:
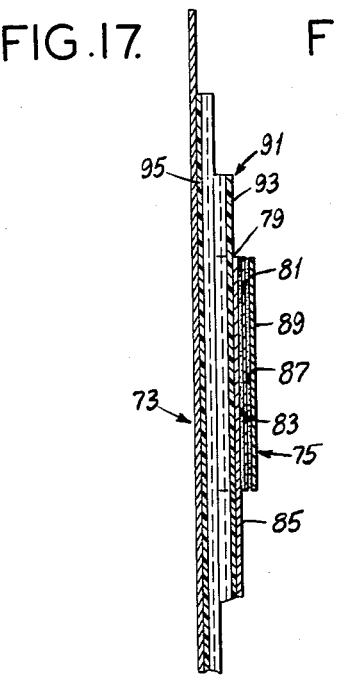
FIG. 17 is a section taken along line 17—17 in FIG. 16.
Figure 18:
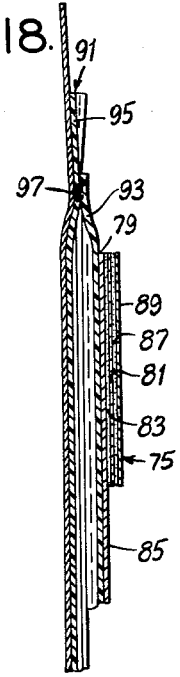
FIG. 18 is a section similar to FIG. 17 but showing the inner polyethylene ply heat sealed before the end closure is folded and secured to the separate securing strip.
Figure 19:
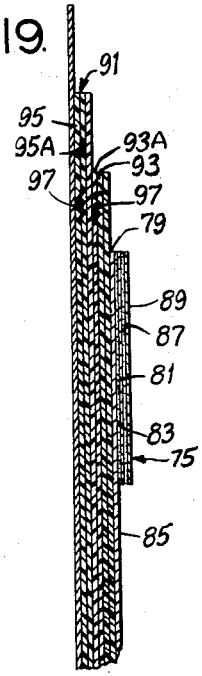
FIG. 19 is a section taken through the gusset of the bag shown in FIG. 16 and showing the gusset panels of the inner ply being heat sealed together.

An inner ply indicated generally at 91 constituting walls 93 and 95 is formed of polyethylene and may be heat-sealed before end closure 77 is secured as indicated in FIG. 18 along a line indicated at 97. As shown in FIG. 16, line 97 extends across the width of bag 73 and wall 93 to seal walls 93 and 95 together at a position beyond the fold line of end closure 77 before the end closure is secured. After walls 93 and 95 have been heat-sealed together, cover strip 89 may be peeled off and end closure 77 may be secured to pressure-sensitive adhesive layer 87 with each extension on end closure 77 adhered to layer 87 across the entire width of bag 73. FIG. 19 taken through the gusset shows an inner gusset panel 93A heat-sealed to wall 93 and an inner gusset panel 95A heat-sealed to wall 95 along line 97.

It is to be understood that tape 75 may be employed with different adhesives and may be applied adjacent either or both of the end closures. As the upper end closure is normally secured by packers or fillers of the bags, a separate tape 75 is usually applied adjacent only the upper end closure, although it could be applied adjacent the lower end closure, if desired. The lower or factory closure is normaly a pasted closure. The adhesives employed may be of several types, such as heat-seal adhesives, pressure-sensitive adhesives, or remoistenable type adhesives. However, in the event tape 75 is employed with a polyethylene inner ply, a heat seal or heat-activated adhesive would not be employed as this would result in and undesirable heat seal being formed across the walls of the inner ply when the end closure is heat sealed. In the event remoistenable adhesives, such as starch dextrin or animal gue based adhesives, are employed as adhesive layer 87, a separate cover strip would normally not be applied.

While inner ply 91 has been illustrated as formed of polyethylene, it is to be understood the inner ply may be formed of other heat-activated materials, such as polyethylene coated paper, the polyethylene coat being on the inner faces of the inner ply. When a heat-activated inner ply is employed and a heat seal is employed to close the inner ply, any absorption of moisture which might occur through the outer or intermediate plies would be stopped at the inner ply, thereby protecting the contents of the bag. Further, while only two plies have been illustrated in the drawings, it is to be understood that additional plies may be employed with the intermediate plies having a shape conforming to that of the outer ply.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of manufacturing pinch-closure bags comprising combining two continuous webs of bag material to form a multi-ply web and forming the multi-ply web into continuous multi-ply bag tubing by folding the multi-ply web on longitudinal fold lines spaced inward from its side edges to bring said side edges into overlapping relation and seaming said overlapping side edges to form a longitudinal seam for the tubing, the tubing thereby having a front wall between said longitudinal fold lines and a back wall including the longitudinal seam, a first of the webs forming the innermost ply of the tubing and the second forming the outer ply of the tubing, each web having lines of weakness extending thereacross spaced at bag tube length intervals along its length, each line of weakness being a stepped line having a central portion extending between said longitudinal fold lines in the respective web and side portions both offset in the same direction from the central portion extending from the longitudinal fold lines to the side edges of the web and aligned transversely of the web, with steps between the ends of the central portion and the inner ends of said side portions, the offset in the lines of weakness of the first web being less than the offset in the lines of weakness of the second web, the first and second webs being combined so that, at bag tube length intervals, the multi-ply web has a line of weakness of the first web grouped with a line of weakness of the second web, with the arrangement of the lines in each group such that the side portions of the line of weakness of the first web are offset in one direction from the side portions of the line of weakness of the second web, the central portion of the line of weakness of the first web is offset in the same direction from the side portions thereof, and the central portion of the line of weakness of the second web is offset in the same direction from the central portion of the line of weakness of the first web, said tubing thereby having groups of lines of weakness spaced at bag tube length intervals with each group comprising a first line extending across the outer ply of one wall of the tubing, a second line longitudinally offset in one direction from the first line extending across the innermost ply of said one wall, a third line longitudinally offset in the same direction from the second line extending across the innermost ply of the other wall of the tubing, and a fourth line longitudinally offset in the same direction from the third line extending across the outer ply of said other wall, segmenting said tubing at said lines of weakness and thereby forming individual bag tubes each of which has at least at one end theerof a stepped formation in which the innermost ply of one wall has an extension in one direction beyond the outer ply of said one wall for the full width of the bag, the innermost ply of the other wall has an extension in the same direction beyond the innermost ply of said one wall for the full width of the bag, and the outer ply of said other wall has an extension in the same direction beyond the innermost ply of said other wall for the full width of the bag, folding over the stepped formation on a fold line generally coincident with the end edge of the outer ply of said one wall with said extensions face to face with the outside of the outer ply of said one wall, and adhering the folded stepped formation to the outer ply of said one wall thereby to form a pinch end closure.

2. The method of claim 1 wherein the multi-ply web is formed into flat ungusseted tubing to form flat ungusseted bags by folding on single longitudinal fold lines which constitute the side edges of the tubing.

3. The method of claim 1 wherein the multi-ply web is formed into gusseted tubing to form gusseted bags by folding it at each side on inner, intermediate and outer longitudinal fold lines, the inner longitudinal fold line constituting the central fold line of the gusset, the central portion of each line of weakness in the first web extending between the central fold lines of the gussets, and the side portions of each line of weakness in the first web extending from the central fold lines of the gussets out to the side edges of the first web, the steps of each line of weakness of the first web being single steps on the central fold lines of the gussets, the central portion of each line of weakness in the second web extending between the inner gusset fold lines, the side portions of each line of weakness in the second web extending from the outer gusset fold lines to the side edges of the second web, and the steps of each line of weakness of the second web being multiple steps having longitudinal portions on the gusset fold lines and transverse portions extending between the gusset fold lines in register with the central and side portions of the line of weakness in the first web.

References Cited by the Examiner
UNITED STATES PATENTS

| | | | |
|---|---|---|---|
| 2,013,086 | 9/1935 | Baker | 93—14 |
| 2,818,003 | 12/1957 | Browning et al. | 93—19 X |
| 2,975,955 | 3/1961 | McCurry | 229—55 |

FRANK E. BAILEY, *Primary Examiner.*

BERNARD STICKNEY, *Examiner.*